(12) United States Patent
Boivie

(10) Patent No.: US 10,740,746 B2
(45) Date of Patent: Aug. 11, 2020

(54) SECURE NFC FORWARDING FROM A MOBILE TERMINAL THROUGH AN ELECTRONIC ACCESSORY

(71) Applicant: Sony Corporation, Tokyo (JP)

(72) Inventor: Victor Boivie, Lund (SE)

(73) Assignee: Sony Corporation, Tokyo (JP)

( * ) Notice: Subject to any disclaimer, the term of this patent is extended or adjusted under 35 U.S.C. 154(b) by 1637 days.

(21) Appl. No.: 14/515,811

(22) Filed: Oct. 16, 2014

(65) Prior Publication Data
US 2016/0071089 A1    Mar. 10, 2016

Related U.S. Application Data

(60) Provisional application No. 62/048,163, filed on Sep. 9, 2014.

(51) Int. Cl.
*G06Q 30/02*    (2012.01)
*G06Q 20/32*    (2012.01)
(Continued)

(52) U.S. Cl.
CPC ......... *G06Q 20/3278* (2013.01); *G06Q 20/20* (2013.01); *G06Q 20/327* (2013.01); *G06Q 20/382* (2013.01); *G06Q 2220/00* (2013.01)

(58) Field of Classification Search
CPC .. G06Q 20/3278; G06Q 20/327; G06Q 20/20; G06Q 20/382; G06Q 2220/00
See application file for complete search history.

(56) References Cited

U.S. PATENT DOCUMENTS 8,139,768 B2 *   3/2012   Pritchett ............... H04N 5/913
                                                  380/200
9,281,871 B2 *   3/2016   Smith .................. H04B 5/0037
(Continued)

FOREIGN PATENT DOCUMENTS

EP      2 388 744 A2     11/2011
WO   WO 2009/039419 A1    3/2009

OTHER PUBLICATIONS

IEEE 100: The authoritative dictionary of IEEE standards terms. (2000). New York: Institute of Electrical and Electronics Engineers. (Year: 2000).*

(Continued)

*Primary Examiner* — Calvin L Hewitt, II
*Assistant Examiner* — Dennis G Keritsis
(74) *Attorney, Agent, or Firm* — Myers Bigel, P.A.

(57) ABSTRACT

A mobile terminal that includes a processor, a NFC circuit, a wireless network circuit. The processor executes a payment application in a memory to generate transaction data relating to a financial transaction. The NFC circuit receives the transaction data and encrypts the transaction data to output NFC encrypted transaction data. The wireless network circuit establishes a wireless network link with an accessory device that is separate from the mobile terminal, encrypts the NFC encrypted transaction data to output combined wireless network+NFC encrypted transaction data, and transmits the combined wireless network+NFC encrypted transaction data through the Bluetooth link to the accessory device for relay to a financial transaction terminal. Related accessory devices are disclosed for proxy encrypted data between the mobile terminal and a financial transaction terminal.

9 Claims, 5 Drawing Sheets

(51) Int. Cl.
*G06Q 20/38* (2012.01)
*G06Q 20/20* (2012.01)

(56) References Cited

U.S. PATENT DOCUMENTS

| | | | | |
|---|---|---|---|---|
| 2002/0025042 A1* | 2/2002 | Saito | ................ | H04L 9/08 380/258 |
| 2002/0151276 A1* | 10/2002 | Ito | ................ | H04W 24/00 455/41.1 |
| 2004/0005052 A1* | 1/2004 | Maeda | ................ | G06F 11/006 380/28 |
| 2006/0277592 A1* | 12/2006 | Brown | ................ | H04L 63/0428 726/1 |
| 2011/0306297 A1* | 12/2011 | Chang | ................ | H04B 1/3805 455/41.2 |
| 2013/0054473 A1* | 2/2013 | Jan | ................ | G06Q 20/40975 705/71 |
| 2013/0127980 A1* | 5/2013 | Haddick | ................ | G06F 3/013 348/14.08 |
| 2013/0201316 A1* | 8/2013 | Binder | ................ | H04L 67/12 348/77 |
| 2014/0065948 A1* | 3/2014 | Huang | ................ | H05K 5/0086 455/7 |
| 2014/0239065 A1 | 8/2014 | Zhou et al. | | |
| 2015/0073907 A1* | 3/2015 | Purves | ................ | G06Q 20/32 705/14.58 |

OTHER PUBLICATIONS

International Search Report and Written Opinion of the International Searching Authority, International Application No. PCT/JP2015/001254, dated Jun. 1, 2015.

Lee, "NFC Hacking: the Easy Way", DEFCON 20, Jul. 30, 2012, retrieved May 13, 2015 from the Internet: URL:http://blackwinghq.com/assets/labs/presentations/EddieLeeDefcon20.pdf, 29 pp.

Communication pursuant to Article 94(3) EPC corresponding to European Patent Application No. 15713583.1 (dated Jan. 26, 2018) (8 pages).

Klaarbergen, "Mobile Payment Transactions: BLE and/or NFC?", Apr. 1, 2014, retrieved Aug. 24, 2015 from the Internet: URL:http://newscience.ul.com/wp-content/uploads/2014/04/mobile_payment_transactions_ble_and_or_nfc.pdf.

Summons to attend oral proceedings pursuant to Rule 115(1) EPC, Mar. 5, 2020, 11 pp.

Smart Card Alliance: "Security of Proximity Mobile Payments", A Smart Card Alliance Contactless and Mobile Payments Council White Paper, Smart Card Alliance, US, No. CPMC-09001, May 1, 2009, pp. 1-39, XP007913611.

ISO/IEC 7816-4; Identification cards—Integrated circuit cards—Part 4: Organization, security and commands for interchange, Jan. 15, 2005, pp. 1-90, XP005187603, Retrieved May 6, 2015 from the Internet: URL:http://www.embedx.com/pdfs/ISO_STD_7816/info_isoiec7816-4(ed2.0)en.pdf.

* cited by examiner

SECURE NFC FORWARDING FROM A MOBILE TERMINAL THROUGH AN ELECTRONIC ACCESSORY

CROSS REFERENCE TO RELATED APPLICATION

This application claims priority to U.S. provisional Patent Application No. 62/048,163, filed 9 Sep. 2014, the disclosure and content of which is incorporated by reference herein in its entirety.

TECHNICAL FIELD

The present invention relates to wireless communication user equipment and, more particularly, to mobile phones and related electronic accessories such as smart watches and other user wearable accessories.

BACKGROUND

Cell phones and other mobile terminals are increasingly including near field communication (NFC) circuits that can be used to provide credit/debit account information to retail point-of-sale terminals. Because the NFC circuit is embedded within a housing of the phone, a user must properly position a particular part of the phone housing immediately adjacent to a NFC reader of the retail point-of-sale terminal to successfully complete a transaction. It may be undesirably inconvenient for the user to have to retrieve the phone from a briefcase, purse, or pocket in order to complete a purchase.

SUMMARY

Some embodiments of the present disclosure are directed to a mobile terminal that includes a processor, a NFC circuit, a wireless network circuit. The processor executes a payment application in a memory to generate transaction data relating to a financial transaction. The NFC circuit is configured to receive the transaction data responsive to the processor executing the payment application, and encrypt the transaction data to output NFC encrypted transaction data. The wireless network circuit is configured to establish a wireless network link with an accessory device that is separate from the mobile terminal, encrypt the NFC encrypted transaction data to output combined wireless network+NFC encrypted transaction data, and transmit the combined wireless network+NFC encrypted transaction data through the Bluetooth link to the accessory device for relay to a financial transaction terminal.

In a further embodiment, the wireless network circuit includes a Bluetooth circuit that is configured to establish a Bluetooth link with the accessory device, encrypt the NFC encrypted transaction data to output combined Bluetooth+NFC encrypted transaction data, and transmit the combined Bluetooth+NFC encrypted transaction data through the Bluetooth link to the accessory device for relay to the financial transaction terminal.

The processor may be further configured by execution of the payment application to command the accessory device to proxy communications between the mobile terminal and the financial transaction terminal, in accordance with a further embodiment.

The processor may be further configured by execution of the payment application to command the accessory device to forward data received via the Bluetooth link from the mobile terminal to the financial transaction terminal via a NFC link between the accessory device and the financial transaction terminal, and to forward data received via the NFC link from the financial transaction terminal to the mobile terminal via the Bluetooth link, in accordance with a further embodiment.

The processor may be further configured by execution of the payment application to command the accessory device to not perform NFC encryption of data received from the mobile terminal via the Bluetooth link before transmission via the NFC link to the financial transaction terminal, in accordance with a further embodiment.

The Bluetooth circuit may be further configured to transmit the combined Bluetooth+NFC encrypted transaction data by converting the combined Bluetooth+NFC encrypted transaction data to a Bluetooth analog signal, modulating the Bluetooth analog signal with a Bluetooth carrier signal to generate a Bluetooth output signal, and transmitting the Bluetooth output signal via a Bluetooth antenna through the Bluetooth link to the accessory device, in accordance with a further embodiment.

The NFC circuit may be further configured to convert the NFC encrypted transaction data to an NFC analog signal, modulate the NFC analog signal with an NFC carrier signal to generate an NFC output signal, and transmit the NFC output signal via an NFC antenna through a NFC link while the Bluetooth output signal is being transmitted by the Bluetooth circuit through the Bluetooth link to the accessory device, in accordance with a further embodiment.

The NFC circuit may be further configured to output the NFC encrypted transaction data as a digital serial stream to the Bluetooth circuit, in accordance with a further embodiment.

The NFC circuit may be disabled from transmitting the NFC encrypted transaction data through an NFC antenna while the processor is executing the payment application, in accordance with a further embodiment.

The Bluetooth circuit may be further configured to receive transaction response data via the Bluetooth link from the accessory device that is encrypted by a NFC circuit of the financial transaction terminal and is further encrypted by a Bluetooth circuit of the accessory device, and decrypt the transaction response data to remove the Bluetooth encryption while leaving the NFC encryption to output NFC encrypted transaction response data. The NFC circuit may be further configured to decrypt the NFC encrypted transaction response data to remove the NFC encryption to generate transaction response data, and output the transaction response data for use by the payment application, in accordance with a further embodiment.

Some other embodiments are directed to an accessory device for use with a mobile terminal in a financial transaction terminal. The accessory device includes a wireless network circuit and a NFC circuit. The wireless network circuit is configured to establish a wireless network link with the mobile terminal, receive wireless network+NFC encrypted transaction data, via the wireless network link from the mobile terminal, which is encrypted by a NFC circuit of the mobile terminal and is further encrypted by a wireless network circuit of the mobile terminal, and decrypt to wireless network+NFC encrypted transaction data to remove the wireless network encryption while leaving the NFC encryption by the NFC circuit of the mobile terminal to output NFC encrypted transaction data. The NFC circuit is configured to transmit the NFC encrypted transaction data without applying further encryption to the NFC encrypted transaction data by the NFC circuit of the accessory device, via an NFC link to the financial transaction terminal.

The wireless network circuit may include a Bluetooth circuit configured to establish a Bluetooth link with the mobile terminal, receive Bluetooth+NFC encrypted transaction data, via the Bluetooth link from the mobile terminal, which is encrypted by a NFC circuit of the mobile terminal and is further encrypted by a Bluetooth circuit of the mobile terminal, and decrypt the Bluetooth+NFC encrypted transaction data to remove the Bluetooth encryption while leaving the NFC encryption by the NFC circuit of the mobile terminal to output NFC encrypted transaction data, in accordance with a further embodiment.

The processor may be configured to proxy communications between the mobile terminal and the financial transaction terminal, in accordance with a further embodiment.

The processor may be further configured to forward data received via the Bluetooth link from the mobile terminal to the financial transaction terminal via the NFC link between the accessory device and the financial transaction terminal, and to forward data received via the NFC link from the financial transaction terminal to the mobile terminal via the Bluetooth link, in accordance with a further embodiment.

The NFC circuit may be configured to receive the Bluetooth+NFC encrypted transaction data at an internal node of the NFC circuit following an encryptor and before a digital-to-analog converter so that the encryptor does not operate to encrypt the data before the data is converted to an analog signal for transmission via the NFC link to the financial transaction terminal, in accordance with a further embodiment.

The NFC circuit of the accessory device may be configured to transmit the NFC encrypted transaction data without applying further encryption to the NFC encrypted transaction data by the NFC circuit of the accessory device, via the NFC link to the financial transaction terminal, by receiving the NFC encrypted transaction data, providing the NFC encrypted transaction data to an digital-to-analog converter by bypassing an encryptor configured to encrypt data, converting the NFC encrypted transaction data to an NFC analog signal using the digital-to-analog converter, modulating the NFC analog signal with an NFC carrier signal using a modulator to generate an NFC output signal, and transmitting the NFC output signal via an NFC antenna through the NFC link to the financial transaction terminal, in accordance with a further embodiment.

The NFC circuit of the accessory device may be further configured to receive NFC encrypted transaction response data via the NFC link from the financial transaction terminal that is encrypted by a NFC circuit of the financial transaction terminal. The Bluetooth circuit of the accessory device may be further configured to encrypt the NFC encrypted transaction response data to output combined Bluetooth+NFC encrypted transaction response data, and transmit the combined Bluetooth+NFC encrypted transaction response data through the Bluetooth link to the mobile terminal.

The NFC circuit of the accessory device may be further configured to output the NFC encrypted transaction response data to the Bluetooth circuit of the accessory device without decrypting the NFC encrypted transaction response data.

The NFC circuit of the accessory device may be further configured to output the NFC encrypted transaction response data as a digital serial stream to the Bluetooth circuit.

The Bluetooth circuit of the accessory device may be further configured to transmit the combined Bluetooth+NFC encrypted transaction response data through the Bluetooth link to the mobile terminal, by converting the combined Bluetooth+NFC encrypted transaction response data to a Bluetooth analog signal, modulating the Bluetooth analog signal with a Bluetooth carrier signal to generate a Bluetooth output signal, and transmitting the Bluetooth output signal via a Bluetooth antenna through the Bluetooth link to the accessory device.

The accessory device may include a user wearable accessory. The user wearable accessory may include a watch.

Other mobile terminals, the accessory devices, systems, and methods according to other embodiments will be or become apparent to one with skill in the art upon review of the following drawings and detailed description. It is intended that all such additional mobile terminals, the accessory devices, systems, and methods be included within this description, be within the scope of the present invention, and be protected by the accompanying claims.

BRIEF DESCRIPTION OF THE DRAWINGS

Aspects of the present disclosure are illustrated by way of example and are not limited by the accompanying drawings. In the drawings.

DETAILED DESCRIPTION

In the following detailed description, numerous specific details are set forth in order to provide a thorough understanding of embodiments of the invention. However, it will be understood by those skilled in the art that the present invention may be practiced without these specific details. In other instances, well-known methods, procedures, components and circuits have not been described in detail so as not to obscure the present invention. It is intended that all embodiments disclosed herein can be implemented separately or combined in any way and/or combination.

Various embodiments of the present disclosure are directed to delegating NFC communications from a mobile terminal, such as a cellular phone, to an accessory device that can be any type of electronic device that is NFC and Bluetooth enabled and configured to operate according to some embodiments disclosed herein. Example accessory devices include smart watches and other user wearable electronic accessories. The mobile terminal can be a NFC enabled device that is the initiator of NFC communication. The mobile terminal is communicatively connected to the accessory device through a Bluetooth communication link. The accessory device is communicatively connected to a financial transaction terminal or other target device through a NFC link. The phone and the accessory device both include a Bluetooth circuit and a NFC circuit. The term target device or financial transaction terminal is used herein to refer to a retail point-of-sale terminal, a vending machine, another phone, or another NFC enabled communication device.

Figure 1:
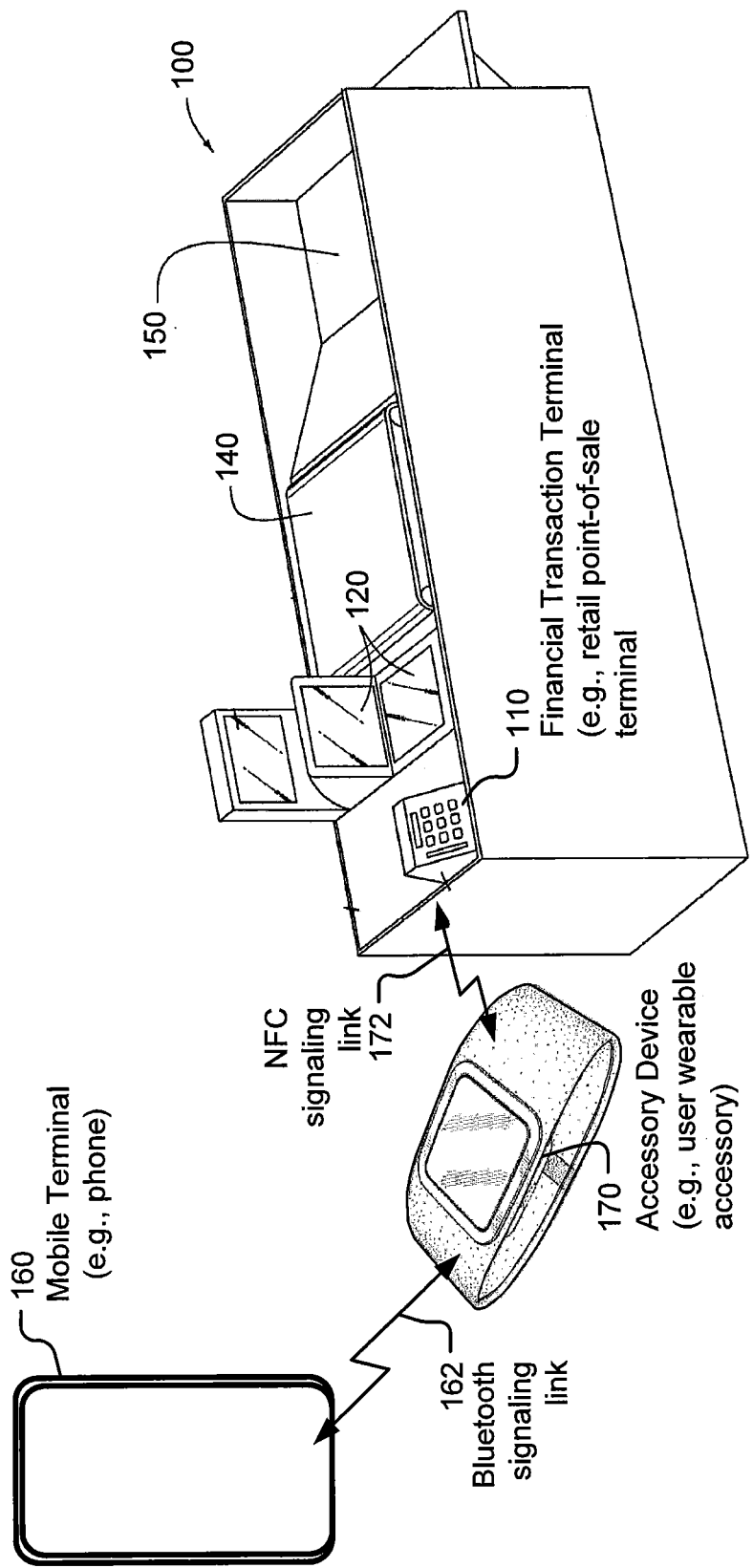
FIG. 1 illustrates a system that includes a phone, an accessory device, which is shown as a smart watch, and a financial transaction terminal, which is shown as a retail point-of-sale terminal, that operate in accordance with some embodiments.

FIG. 1 illustrates a system that includes a mobile terminal 160, an accessory device 170, and a financial transaction terminal 100. The mobile terminal 160 and the accessory device 170 both include an internal NFC circuit and an internal wireless network circuit which may be a Bluetooth circuit, WLAN circuit (e.g., IEEE 802.11 standard based), etc. Although various embodiments are described in the context of the mobile terminal 160 and the accessory device 170 using a combination of NFC and Bluetooth circuits, they may alternatively use a combination of NFC and WLAN circuits, or combination of NFC and other wireless network circuits.

The mobile terminal 160 may be a cellular phone, tablet computer, laptop computer that can operate according to one or more embodiments disclosed herein. The accessory device 170 is illustrated as a smart watch, although it may be other types of user wearable electronic accessories or other electronic accessories that can operate according to one or more embodiments disclosed herein. The financial transaction terminal 110 is illustrated as a retail point-of-sale ("POS") terminal as part of a retail checkout system 100, which includes a product barcode scanner 120 and a conveyor belt 140 that conveys products to a bagging area 150. For convenience of reference and without restriction, the financial transaction terminal 110 is also referred to as a POS terminal.

In one embodiment, the mobile terminal 160 delegates to the accessory device 170 responsibility for NFC communications with the POS terminal 100. The mobile terminal 160 operates to proxy the NFC communication to the accessory device 170, so that the accessory device 170 performs NFC communication through a NFC signaling link 172 with the POS terminal 100 on behalf of the mobile terminal 160. The accessory device 170 communicates with the mobile terminal 160 through a Bluetooth signaling link 162. The mobile terminal 160 and POS terminal 100 are the end-devices in the communications with the accessory device 170 providing relay of communications there between.

In accordance with some embodiments disclosed herein, security and/or user operational convenience can be improved by the mobile terminal 160 using its internal NFC circuit to encrypt transaction data that will be sent to the POS terminal 110. However, instead of sending the NFC encrypted transaction data through the internal NFC circuit directly to an NFC circuit of the POS terminal 110, it instead further encrypts the NFC encrypted transaction data using an internal Bluetooth circuit and then communicates the combined Bluetooth and NFC encrypted transaction data (also referred to as "Bluetooth+NFC encrypted transaction data") through the Bluetooth link 162 to the accessory device 170. The accessory device 170 decrypts to remove the Bluetooth encryption from the NFC encrypted transaction data, and then communicates the NFC encrypted transaction data through the NFC link 172 to the POS terminal 110. Similar corresponding operations are performed in the opposite direction from the POS terminal 110 through the accessory device 170 to the mobile terminal 160 as explained herein in further detail.

Figure 2A:
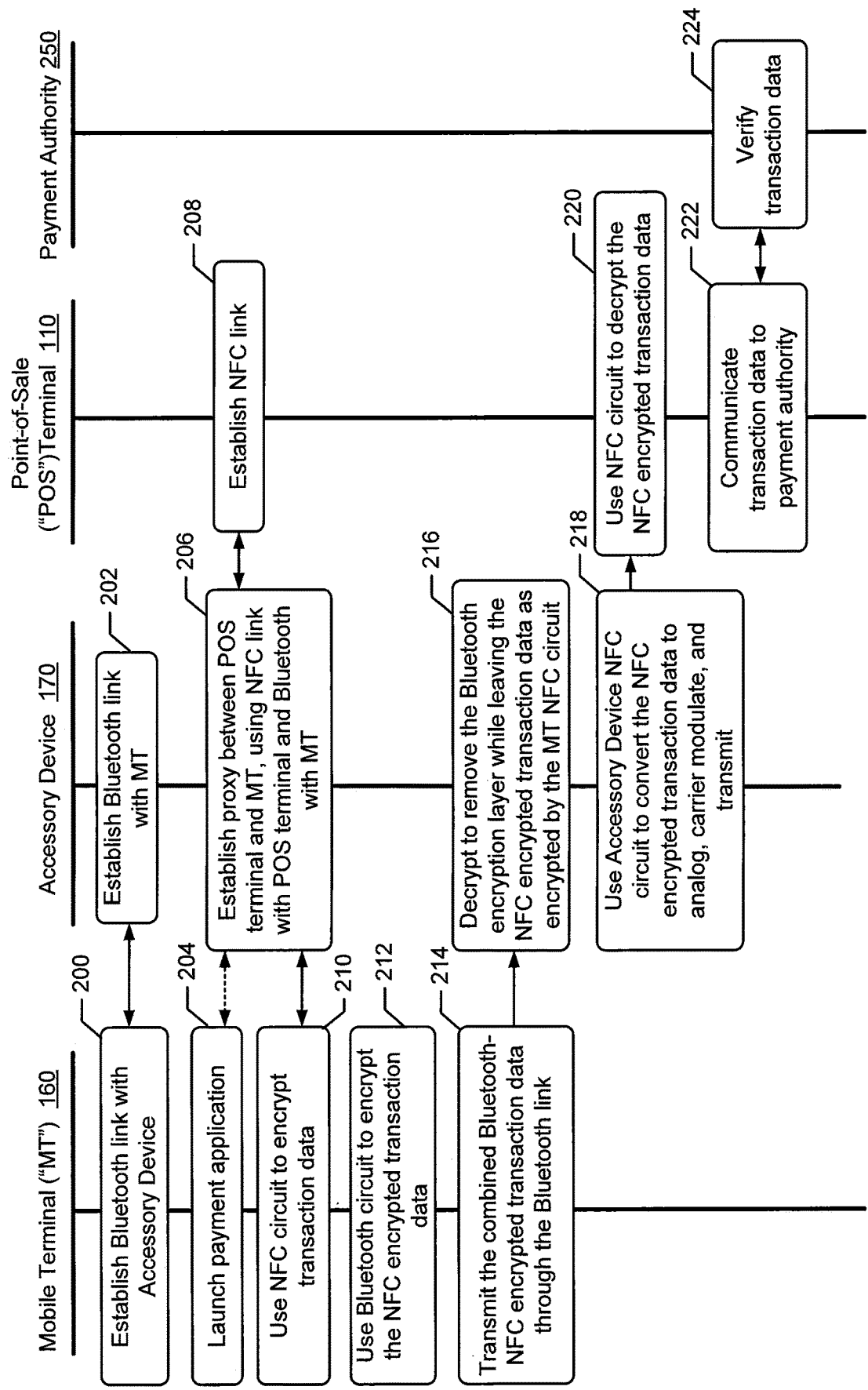
FIGS. 2A-2B are combined data flow diagrams and flowcharts of operations and methods by a mobile terminal, and accessory device, a point-of-sale terminal, and a payment authority, in accordance with some embodiments.
Figure 2B:
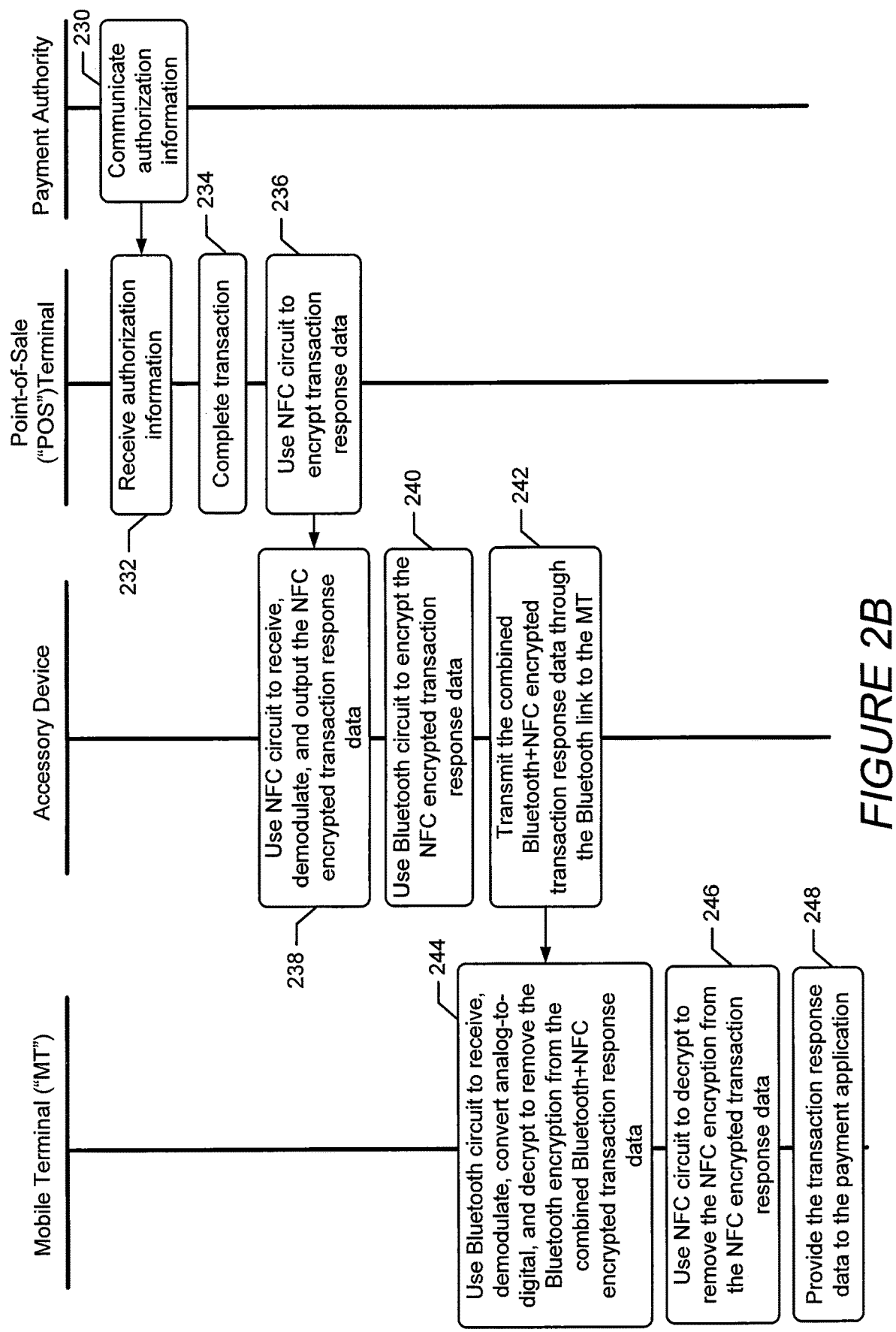

FIGS. 2A-2B are combined data flow diagrams and flowcharts of operations and methods by the mobile terminal 160, the accessory device 170, the POS terminal 110, and a payment authority (e.g., credit card and/or debit card processing system), in accordance with some embodiments.

Referring to FIGS. 2A-2B, the mobile terminal 160 and the accessory device 170 mutually establish (blocks 200, 202) a Bluetooth link between them. Mobile terminal 160 launches (block 204) a payment application, which may be an Android or IOS application executed by the mobile terminal 160. The mobile terminal 160, e.g., via the payment application, may operate to command the accessory device 170 to establish (block 206) proxy functionality between the POS terminal 110 and the mobile terminal 160, using an NFC link with the POS terminal and a Bluetooth link with the mobile terminal 160.

The payment application executed by the mobile terminal 160 generates transaction data that is to be communicated to the POS terminal 110 for verification by the payment authority 250. The transaction data may include, for example, credit card account information, debit card account information, or other data that the POS terminal 100 can use to complete a financial transaction. The mobile terminal 160 uses its internal NFC circuit to encrypt (block 212) the transaction data and output NFC encrypted transaction data, which is provided to the Bluetooth circuit internal to the mobile terminal 160. As will be explained further detail below, the NFC circuit can output the NFC encrypted transaction data as a digital serial stream for use by the Bluetooth circuit. The digital serial stream can contain data that would normally have been communicated through an NFC antenna in the mobile terminal 160. The NFC circuit may output the digital serial stream through a testing interface configured for enabling testing or verification of the NFC circuit functionality.

The mobile terminal 160 uses the internal Bluetooth circuit to encrypt (block 212) the NFC encrypted transaction data, and output combined Bluetooth plus NFC encrypted transaction data. The combined Bluetooth plus NFC encrypted transaction data is transmitted (block 214) through the Bluetooth link to the accessory device 170 for relay to the POS terminal 110.

The accessory device 170 receives, via the Bluetooth link from the mobile terminal 160, the Bluetooth+NFC encrypted transaction data. The accessory device 170 decrypts (block 216) the Bluetooth+NFC encrypted transaction data to remove the Bluetooth encryption while leaving the NFC encryption by the NFC circuit of the mobile terminal 160 to output NFC encrypted transaction data. The accessory device 170 uses (block 218) its internal NFC circuit to transmit the NFC encrypted transaction data via the NFC link to the POS terminal 110 without applying further encryption to the NFC encrypted transaction data by the NFC circuit of the accessory device 170. The NFC circuit internal to the accessory device 170 is used to convert the NFC encrypted transaction data to an analog signal, modulate the analog signal with the carrier, and transmit the modulated signal through the antenna via the NFC link to the POS terminal 110.

The POS terminal 110 receives and uses (block 220) its internal NFC circuit to decrypt the NFC encrypted transaction data and output the transaction data free of the encryption that had been applied by the Bluetooth and NFC circuits of the mobile terminal 160. The transaction data is communicated (block 222) to the payment authority 250. The payment authority 250 (e.g., card issuing bank server such as a Visa or other card server connected to VisaNet, BankNet, etc.). The payment authority 250 verifies (block 224) the transaction data to generate an authorization decision based on whether an account number identifiable based on the transaction data has a sufficient credit limit and/or existing funds to cover the amount of the financial transaction. The payment authority 250 communicates (block 230) authorization information based thereon to the POS terminal 110. The POS terminal 110 receives (block 232) the authorization information which it uses to control whether the transaction is completed (block 234). The POS terminal 110 uses its internal NFC circuit to encrypt (block 236) the transaction response data and transmit the NFC encrypted transaction response data to the accessory device 170 through the NFC link.

The NFC circuit of the accessory device 170 receives the NFC encrypted transaction response data via the NFC link from the POS terminal 110. The NFC circuit of the accessory device 170 can output the NFC encrypted transaction response data to the Bluetooth circuit of the accessory device 170 without decrypting the NFC encrypted transaction response data received from the POS terminal 110 via the NFC like. The accessory device 170 uses its internal Bluetooth circuit to encrypt (block 240) the NFC encrypted transaction response data to generate combined Bluetooth+NFC encrypted transaction response data, which is transmitted (block 242) through the Bluetooth link to the mobile terminal 160.

The mobile terminal 160 uses its internal Bluetooth circuit to receive the combined Bluetooth+NFC encrypted transaction response data via the Bluetooth link, and to decrypt (block 244) the combined Bluetooth+NFC encrypted transaction response data to remove the Bluetooth encryption (which was added by the Bluetooth circuit of the accessory device 170) while leaving the NFC encryption (which was added by the NFC circuit of the POS terminal 110) to output NFC encrypted transaction response data. The NFC circuit of the mobile terminal 160 then decrypts (block 246) the NFC encrypted transaction response data to remove the NFC encryption to generate transaction response data that is free of the Bluetooth encryption by the accessory device 170 and the NFC encryption of the POS terminal 110. The transaction response data is provided (block 248) to the payment application being executed by the mobile terminal 160.

Figure 3:
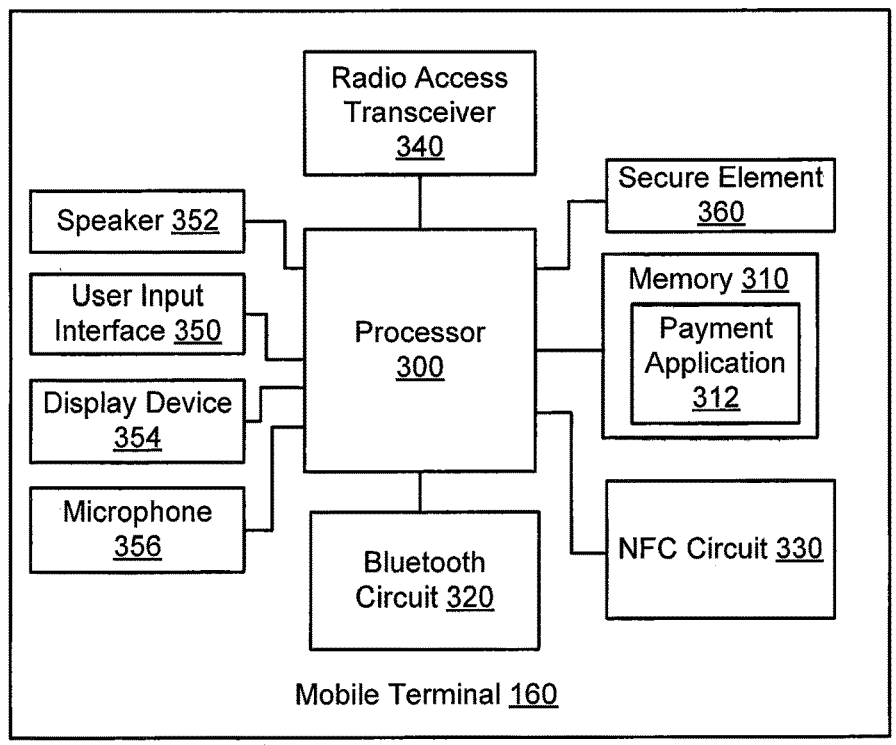
FIG. 3 is a block diagram of a mobile terminal configured according to some embodiments.
Figure 4:
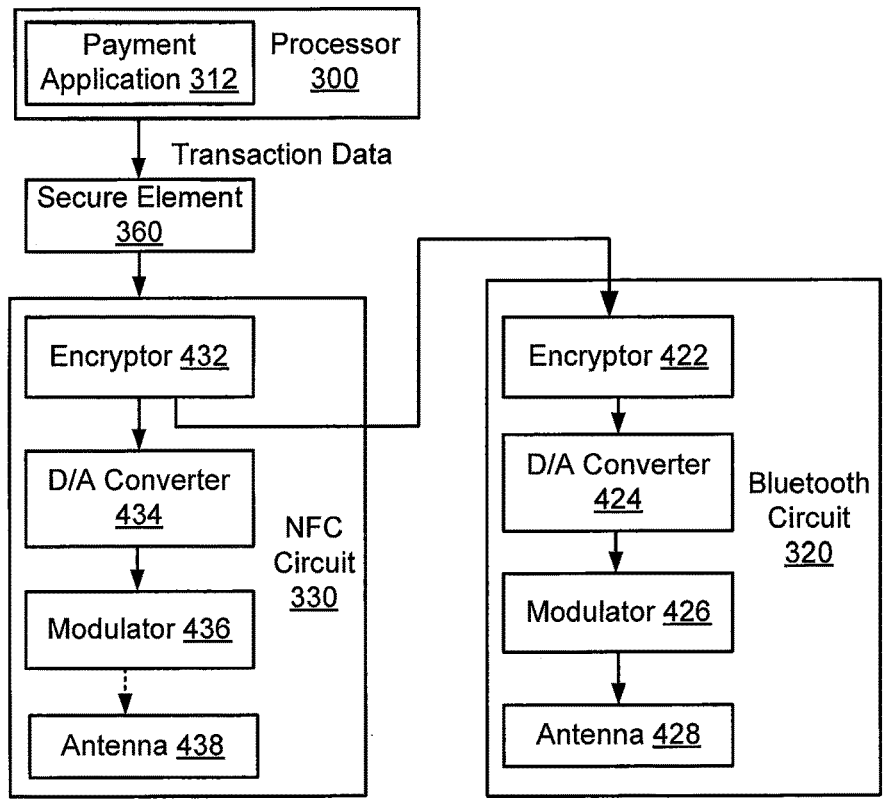
FIG. 4 is a further block diagram of the processor, the NFC circuit, and the Bluetooth circuit of the mobile terminal of FIG. 3 configured according to some embodiments.

FIGS. 3 and 4 illustrate block diagrams of the mobile terminal 160. Referring to FIG. 3, the mobile terminal 160 includes a NFC circuit 330, a Bluetooth circuit 320, and a processor 300. The processor 300 may include one or more data processing circuits, such as a general purpose and/or special purpose processor, such as a microprocessor and/or digital signal processor. The processor 300 is configured to execute computer program code, such as the payment application 312, in the memory 310, described below as a non-transitory computer readable medium, to perform at least some of the operations and methods described herein as being performed by a mobile terminal. The mobile terminal 160 may further include a speaker 352, user input interface 350, a display device 354, and a microphone 366. The mobile terminal 160 may furthermore include a radio access transceiver 340 that can include, but is not limited to, a LTE or other cellular transceiver, WLAN transceiver (IEEE 802.11), WiMax transceiver, or other communication transceiver configured to communicate with a network node of a communications system.

Mobile terminal 160 may furthermore include a secure element 360 that can be used to handle key management (e.g., cryptographic data) that is used during a financial transaction with the POS terminal 110. The secure element 360 may, for example, be used in combination with the payment application 312 to exchange keys with a secure element residing in the POS terminal 110 during the financial transaction. Embedded secure applications on the NFC circuit 200 may be configured to communicate securely with the payment application 312 executed by the processor 300 and with secure applications on a SIM card or other form of the secure element 360.

In accordance with some embodiments disclosed herein, security and/or user operational convenience can be improved by the mobile terminal 160 forwarding the NFC signals over the Bluetooth link to the accessory device 170. The forwarding can include demodulating the 13.56 MHz signals, for communication through the Bluetooth circuit 320 over the Bluetooth link for receipt by a Bluetooth circuit of the accessory device 170.

FIG. 4 illustrates further detail of the NFC circuit 330 and the Bluetooth circuit 320 of the mobile terminal 160 which are configured according to at least some embodiments. Referring to FIG. 4, the payment application 312 being executed by the processor 300 can output transaction data that is combined with a security key provided by the secure element 360. Within the NFC circuit 330, an encryptor 432 encrypts the transaction data to generate NFC encrypted transaction data.

The NFC encrypted transaction data may be output as a digital serial stream from the NFC circuit 330, which may be formatted according to NFCIP-1, and which may not have yet been transformed to the analog domain. For example, as shown in FIG. 4, the NFC encrypted transaction data can be output from the encryptor 432 of the NFC circuit 330 to the input of an encryptor 422 of the Bluetooth circuit 320. In one embodiment, the NFC circuit 330 is configured to output the digital serial stream that would normally have been converted to an analog signal by a digital-to-analog (D/A) converter 434, modulated with the carrier signal by modulator 436, and transmitted through the antenna 438. The NFC circuit 330 may output the digital serial stream through a testing interface configured for enabling testing or verification of the NFC circuit 330 functionality.

Within the Bluetooth circuit 320, the encryptor 422 encrypts the NFC transaction data to output combined Bluetooth+NFC encrypted transaction data, which is converted to an analog signal by a D/A converter 424, modulated with carrier signal by a modulator 426, and transmitted through an antenna 428 via the Bluetooth link to the accessory device 170.

While the processor 300 is executing the payment application 312, the NFC circuit 330 may be disabled from transmitting the NFC encrypted transaction data through the NFC antenna 438. Alternatively, the NFC circuit 330 may also convert the NFC encrypted transaction data to an analog signal by the D/A converter 434, modulate the signal with a carrier signal by modulator 436, and transmit the modulated signal through the antenna 438 while the Bluetooth signal containing the transaction data is being transmitted by the Bluetooth circuit 320 through the Bluetooth link to the accessory device 170.

The processor 300 may be configured by execution of the payment application 312 to command the accessory device 170 to forward data received via the Bluetooth link from the mobile terminal 160 to the POS terminal 110 via the NFC link between the accessory device 160 and the POS terminal 110, and to forward data received via the NFC link from the POS terminal 110 to the mobile terminal 160 via the Bluetooth link. The processor 300 may be further configured by execution of the payment application 312 to command the accessory device 170 to not perform NFC encryption of data received from the mobile terminal 160 via the Bluetooth link before transmission via its NFC link to the POS terminal 110.

Figure 5:
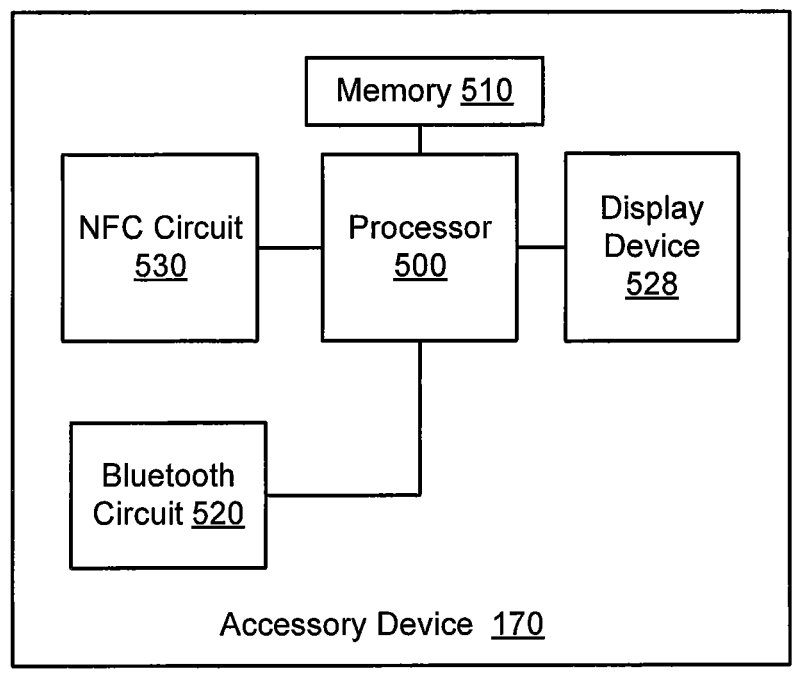
FIG. 5 is a block diagram of an accessory device configured according to some embodiments.
Figure 6:
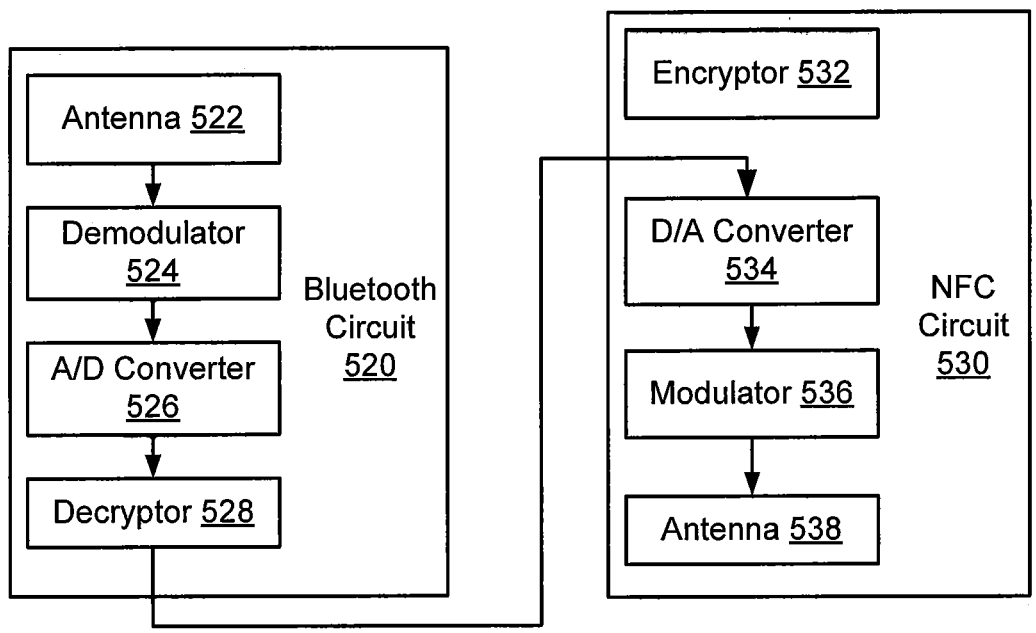
FIG. 6 is a further block diagram of the Bluetooth circuit and the NFC circuit of the accessory device of FIG. 5 configured according to some embodiments.

FIGS. 5 and 6 are block diagrams of the accessory device 170. Referring to FIG. 6, the accessory device 170 includes a NFC circuit 530, a Bluetooth circuit 520, and a processor 500. The processor 500 may include one or more data processing circuits, such as a general purpose and/or special purpose processor, such as a microprocessor and/or digital signal processor. The processor 500 is configured to execute computer program code from a memory 510, described below as a non-transitory computer readable medium, to perform at least some of the operations and methods described herein as being performed by an accessory device. The accessory device 170 may further include a display device 528.

The accessory device 170 forwards data received by the Bluetooth circuit 520 via the Bluetooth link from the mobile terminal 160 to the POS terminal 110 via NFC circuit 530 and the NFC link to the POS terminal 110, and to forward data received by the NFC circuit 530 via the NFC link from the POS terminal 110 to the mobile terminal 170 via the Bluetooth circuit 520 and the Bluetooth link.

Referring to FIG. 6, the Bluetooth circuit 520 includes an antenna 522 that receives Bluetooth signals via the Bluetooth link from the mobile terminal 160. The received signals are demodulated to a baseband signal by the modulator 524, and converted to digital data by an analog-to-digital (A/D) converter 526. As explained above, the digital data contains combined Bluetooth+NFC encrypted transaction data transmitted by the Bluetooth circuit 320 of the mobile terminal 160. A decryptor 528 decrypts the Bluetooth+NFC encrypted transaction data to remove the Bluetooth encryption while leaving the NFC encryption by the NFC circuit 330 of the mobile terminal 160 to output NFC encrypted transaction data for use by the NFC circuit 530.

The NFC circuit 530 can receive the NFC encrypted transaction data at an internal node of the NFC circuit 530 following an encryptor 532 and before a D/A converter 534, so that the encryptor 532 does not operate to encrypt the NFC encrypted transaction data before the NFC encrypted transaction data is converted to an analog signal by the D/A converter 534. The analog signal is modulated with the carrier signal by a modulator 536 to generate an NFC output signal, and transmitted the NFC output signal through an antenna 538 via the NFC link to the POS terminal 110.

The NFC circuits 330 and 530 may operate according to ISO/IEC 14443 and/or FeliCa contactless IC card standards. In some embodiments, the NFC circuits 330 and 530 communicate with each other using short-range high frequency wireless communication technology which enables the exchange of data between devices over about a 10 cm distance, although the NFC circuits 330 and 530 are not limited to operating in any defined range. The communication protocol and operation can be an extension of the ISO 14443 proximity-card standard (e.g., contactless card, RFID) and can be specified in the ECMA-340 and ISO/IEC 18092 technology standards. Some embodiments of the NFC circuits 330 and 530 may communicate using existing ISO 14443 smartcards and readers and can thereby be compatible with existing contactless communication infrastructure.

The NFC circuits 330 and 530 may communicate via magnetic field induction. Respective loop antennas connected to the NFC circuits 330 and 530 are placed in close proximity to each other within the other's antenna near field, thereby effectively forming an air-core transformer. Some embodiments of the NFC circuits 330 and 530 can transmit within the globally available and unlicensed radio frequency ISM band of 13.56 MHz, with a bandwidth of almost 2 MHz. Some embodiments of the NFC circuits 330 and 530 can support data rates of 106, 212, or 424 kbit/s using a modified Miller coding or Manchester coding to encode and decode communicated data.

Further Definitions and Embodiments

In the above-description of various embodiments of the present invention, it is to be understood that the terminology used herein is for the purpose of describing particular embodiments only and is not intended to be limiting of the invention. Unless otherwise defined, all terms (including technical and scientific terms) used herein have the same meaning as commonly understood by one of ordinary skill in the art to which this invention belongs. It will be further understood that terms, such as those defined in commonly used dictionaries, should be interpreted as having a meaning that is consistent with their meaning in the context of this specification and the relevant art and will not be interpreted in an idealized or overly formal sense unless expressly so defined herein.

When a node is referred to as being "connected", "coupled", "responsive", or variants thereof to another node, it can be directly connected, coupled, or responsive to the other node or intervening nodes may be present. In contrast, when an node is referred to as being "directly connected", "directly coupled", "directly responsive", or variants thereof to another node, there are no intervening nodes present. Like numbers refer to like nodes throughout. Furthermore, "coupled", "connected", "responsive", or variants thereof as used herein may include wirelessly coupled, connected, or responsive. As used herein, the singular forms "a", "an" and "the" are intended to include the plural forms as well, unless the context clearly indicates otherwise. Well-known functions or constructions may not be described in detail for brevity and/or clarity. The term "and/or" includes any and all combinations of one or more of the associated listed items.

As used herein, the terms "comprise", "comprising", "comprises", "include", "including", "includes", "have", "has", "having", or variants thereof are open-ended, and include one or more stated features, integers, nodes, steps, components or functions but does not preclude the presence or addition of one or more other features, integers, nodes, steps, components, functions or groups thereof. Furthermore, as used herein, the common abbreviation "e.g.", which derives from the Latin phrase "exempli gratia," may be used to introduce or specify a general example or examples of a previously mentioned item, and is not intended to be limiting of such item. The common abbreviation "i.e.", which derives from the Latin phrase "id est," may be used to specify a particular item from a more general recitation.

Example embodiments are described herein with reference to block diagrams and/or flowchart illustrations of computer-implemented methods, apparatus (systems and/or devices) and/or computer program products. It is understood that a block of the block diagrams and/or flowchart illustrations, and combinations of blocks in the block diagrams and/or flowchart illustrations, can be implemented by computer program instructions that are performed by one or more computer circuits. These computer program instructions may be provided to a processor circuit of a general purpose computer circuit, special purpose computer circuit, and/or other programmable data processing circuit to produce a machine, such that the instructions, which execute via the processor of the computer and/or other programmable data processing apparatus, transform and control transistors, values stored in memory locations, and other hardware components within such circuitry to implement the functions/acts specified in the block diagrams and/or flowchart block or blocks, and thereby create means (functionality) and/or structure for implementing the functions/acts specified in the block diagrams and/or flowchart block(s).

These computer program instructions may also be stored in a tangible computer-readable medium that can direct a computer or other programmable data processing apparatus to function in a particular manner, such that the instructions stored in the computer-readable medium produce an article of manufacture including instructions which implement the functions/acts specified in the block diagrams and/or flowchart block or blocks.

A tangible, non-transitory computer-readable medium may include an electronic, magnetic, optical, electromagnetic, or semiconductor data storage system, apparatus, or device. More specific examples of the computer-readable medium would include the following: a portable computer diskette, a random access memory (RAM) circuit, a read-only memory (ROM) circuit, an erasable programmable read-only memory (EPROM or Flash memory) circuit, a portable compact disc read-only memory (CD-ROM), and a portable digital video disc read-only memory (DVD/Blu-eRay).

The computer program instructions may also be loaded onto a computer and/or other programmable data processing apparatus to cause a series of operational steps to be performed on the computer and/or other programmable apparatus to produce a computer-implemented process such that the instructions which execute on the computer or other programmable apparatus provide steps for implementing the functions/acts specified in the block diagrams and/or flowchart block or blocks. Accordingly, embodiments of the present invention may be embodied in hardware and/or in software (including firmware, resident software, microcode, etc.) that runs on a processor such as a digital signal processor, which may collectively be referred to as "circuitry," "a module" or variants thereof.

It should also be noted that in some alternate implementations, the functions/acts noted in the blocks may occur out of the order noted in the flowcharts. For example, two blocks shown in succession may in fact be executed substantially concurrently or the blocks may sometimes be executed in the reverse order, depending upon the functionality/acts involved. Moreover, the functionality of a given block of the flowcharts and/or block diagrams may be separated into multiple blocks and/or the functionality of two or more blocks of the flowcharts and/or block diagrams may be at least partially integrated. Finally, other blocks may be added/inserted between the blocks that are illustrated. Moreover, although some of the diagrams include arrows on communication paths to show a primary direction of communication, it is to be understood that communication may occur in the opposite direction to the depicted arrows.

Many different embodiments have been disclosed herein, in connection with the above description and the drawings. It will be understood that it would be unduly repetitious and obfuscating to literally describe and illustrate every combination and subcombination of these embodiments. Accordingly, the present specification, including the drawings, shall be construed to constitute a complete written description of various example combinations and subcombinations of embodiments and of the manner and process of making and using them, and shall support claims to any such combination or subcombination.

Many variations and modifications can be made to the embodiments without substantially departing from the principles of the present invention. All such variations and modifications are intended to be included herein within the scope of the present invention.

What is claimed is:

1. A mobile terminal comprising:
    a processor configured to execute an application in a memory to generate transaction data;
    a NFC circuit configured to:
        receive the transaction data responsive to the processor executing the application; and
        encrypt the transaction data to output NFC encrypted transaction data;
    a wireless network circuit configured to:
        establish a wireless network link with an accessory device, wherein the accessory device is separate from the mobile terminal;
        encrypt the NFC encrypted transaction data to output combined wireless network+NFC encrypted transaction data; and
        transmit the combined wireless network+NFC encrypted transaction data through the wireless network link to the accessory device for relay to another NFC enabled communication device,
    wherein the NFC circuit comprises a first NFC circuit, wherein the wireless network link comprises a Bluetooth link, and wherein the wireless network circuit comprises a Bluetooth circuit configured to:
        receive encrypted transaction response data via the Bluetooth link from the accessory device that is encrypted by a second NFC circuit of the another NFC enabled communication device with a NFC encryption and is further encrypted by a Bluetooth circuit of the accessory device with a Bluetooth encryption; and
        decrypt the encrypted transaction response data to remove the Bluetooth encryption while leaving the NFC encryption to output NFC encrypted transaction response data; and
    wherein the first NFC circuit is further configured to:
        decrypt the NFC encrypted transaction response data to remove the NFC encryption to generate transaction response data; and
        output the transaction response data for use by the application.

2. The mobile terminal of claim 1, wherein the wireless network link comprises a Bluetooth link, and wherein the wireless network circuit comprises a Bluetooth circuit configured to:
    establish the Bluetooth link to the accessory device;
    encrypt the NFC encrypted transaction data to output combined Bluetooth+NFC encrypted transaction data; and
    transmit the combined Bluetooth+NFC encrypted transaction data through the Bluetooth link to the accessory device for relay to the another NFC enabled communication device.

3. The mobile terminal of claim 1, wherein the processor is further configured to command the accessory device to proxy communications between the mobile terminal and the another NFC enabled communication device.

4. The mobile terminal of claim 3,
    wherein the wireless network link comprises a Bluetooth link, and
    wherein the processor is further configured to command the accessory device to forward a first data received via the Bluetooth link from the mobile terminal to the another NFC enabled communication device via a NFC link between the accessory device and the another NFC enabled communication device, and to forward a second data received via the NFC link from the another NFC enabled communication device to the mobile terminal via the Bluetooth link.

5. The mobile terminal of claim 4, wherein the processor is further configured to command the accessory device to not perform NFC encryption of the first data received via the Bluetooth link from the mobile terminal before transmission via the NFC link to the another NFC enabled communication device.

6. The mobile terminal of claim 1, wherein the wireless network link comprises a Bluetooth link, and wherein the wireless network circuit comprises a Bluetooth circuit configured to transmit combined Bluetooth+NFC encrypted transaction data by performing operations comprising:
  converting the combined Bluetooth+NFC encrypted transaction data to a Bluetooth analog signal;
  modulating the Bluetooth analog signal with a Bluetooth carrier signal to generate a Bluetooth output signal; and
  transmitting the Bluetooth output signal via a Bluetooth antenna through the Bluetooth link to the accessory device.

7. The mobile terminal of claim 6, wherein the NFC circuit is further configured to:
  convert the NFC encrypted transaction data to an NFC analog signal;
  modulate the NFC analog signal with an NFC carrier signal to generate an NFC output signal; and
  transmit the NFC output signal via an NFC antenna through a NFC link while the Bluetooth output signal is being transmitted by the Bluetooth circuit through the Bluetooth link to the accessory device.

8. The mobile terminal of claim 1, wherein the wireless network circuit comprises a Bluetooth circuit, and wherein:
  the NFC circuit is further configured to output the NFC encrypted transaction data as a digital serial stream to the Bluetooth circuit.

9. The mobile terminal of claim 1, wherein the NFC circuit is configured to be selectively disabled from transmitting the NFC encrypted transaction data through an NFC antenna.

* * * * *